Dec. 1, 1964    A. W. VIRTA    3,158,936
LAYOUT MACHINE SCRIBE
Filed Nov. 13, 1961
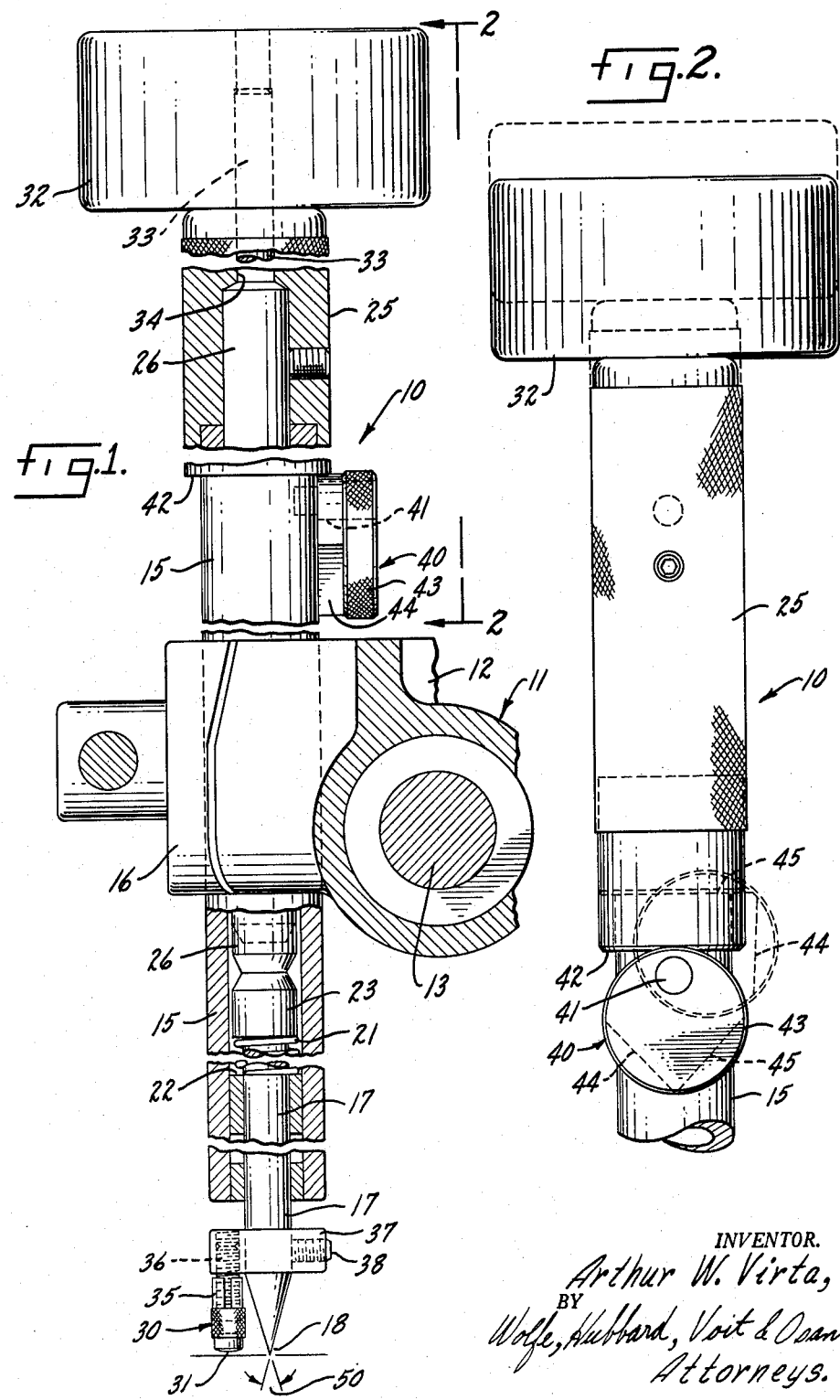
INVENTOR.
Arthur W. Virta,
BY
Wolfe, Hubbard, Voit & Osann
Attorneys.

United States Patent Office 3,158,936
Patented Dec. 1, 1964

3,158,936
LAYOUT MACHINE SCRIBE
Arthur W. Virta, Mount Prospect, Ill., assignor to Ancraft Products Co., Chicago, Ill., a corporation of Illinois
Filed Nov. 13, 1961, Ser. No. 151,884
1 Claim. (Cl. 33—18)

This invention relates to scribing devices and concerns, more particularly, a layout machine scribe particularly well suited for making plastic charts.

Optical comparators or shadowgraphs are widely utilized for inspection of relatively small and complex parts. In such a machine, an enlarged image of the inspected part is projected onto a screen where it may be fitted into and compared with an enlarged drawing of the part. These drawings are referred to as charts, and normally comprise a sheet of clear plastic having lines scribed into the surface of the sheet and then filled in with black filler.

A chart of the above type is made from sheets of clear plastic which have been given an opaque coating. The desired drawing is formed by scribing lines through the coating and into the plastic. A paint-like ink is brushed into the scribed lines and the entire surface of the sheet is washed with solvent so as to wipe away the coating and the extra ink, leaving black lines etched in clear plastic.

It is advantageous to make such charts with a layout machine in which a scribe is mounted for controlled and measurable movement over a working table. The plastic is, of course, held on the table and the scribe manipulated to produce the desired etched lines.

It is an object of the present invention to provide a novel layout machine scribe that is particularly well suited for making plastic charts of the above described type.

In more detail, it is an object to provide a novel scribe for a layout machine that will reliably form fine, uniform lines of desired width in relatively soft materials. A related object is to provide a scribe of the above type that can be easily adjusted to form lines of the particular width desired and which thus is able to make charts having uniform line weights even though the opaque coating on the chart materials may vary in thickness.

Another object is to provide a scribe of the above character which is easy to manipulate and which has a quick acting throw-off for conveniently raising the scribe point from the work without disturbing the adjustment of the scribe.

Other objects and advantages of the invention will become apparent upon reading the following detailed description and upon reference to the drawings, in which:

FIGURE 1 is an elevation, partially broken away and partially in section, of a scribe constructed in accordance with the present invention; and FIG. 2 is a fragmentary elevation taken approximately along the line 2—2 in FIG. 1.

While the invention will be described in connection with a preferred embodiment, it will be understood that I do not intend to limit the invention to that embodiment. On the contrary, I intend to cover all alternatives, modifications, and equivalents as may be included within the spirit and scope of the invention as defined by the appended claim.

Turning now to the drawings, there is shown a scribe 10 constructed in accordance with the invention and mounted in a layout machine 11 of which only the carriage 12 and its guide rod 13 is shown. The layout machine 11 may be of the type illustrated and described in my copending application, Serial No. 784,612, filed January 2, 1959, now patent 3,116,556 granted Jan. 7, 1964, that is assigned to the assignee of the present invention.

The scribe 10 includes a sleeve 15 that is mounted in a split collar 16 which forms a part of the layout machine carriage 12. The collar 16 is tightened so as to tightly grip the sleeve 15 and hold it rigidly in a substantially vertical position. In operation, the carriage 12 slides smoothly along the rod 13 and the rod 13 is also mounted for smooth movement in a direction transverse to its axis as will be well understood by those skilled in this art. The sleeve 15 thus may be moved in a plane above a horizontal working table forming a part of the layout machine and which is not shown herein.

The working element of the scribe 10 is defined by a tip 17 that is slidably mounted in the lower portion of the sleeve 15. The tip 17 has a scribing point 18 which projects from the lower end of the sleeve 15. In the preferred embodiment, the tip 17 is biased upwardly to an inactive position by a helical spring 21 which is fitted between a shoulder 22 formed within the sleeve 15 and an enlarged head 23 on the tip 17. The sleeve 15 is normally positioned in the collar 16 so that the upwardly biased tip 17 clears the workpiece.

For manipulating the tip 17, a handle 25 is provided having a shaft 26 which is slidably mounted in the sleeve 15. Forcing the handle 25 downwardly causes the end of the shaft 26 to strike the head 23 of the tip 17 so as to move the tip point 18 into the work.

In accordance with the invention, the tip 17 is biased toward the work and a thimble 30 having a smooth head 31 is secured to the tip 17 and adjustably mounted so that the point 18 projects a selectable distance beyond the head. In this way, the thimble controls the penetration of the point 18 into soft material. In the illustrated construction, the tip 17 is biased by a weight 32 which is fitted on the handle 25. A dowel pin 33 is secured to the weight 32 and is fitted in a hole 34 formed in the top of the handle 25 so as to releasably secure the weight in position. The weight 32 has sufficient mass to overcome the force of the spring 21 so that the tip 17 is urged downwardly toward the work.

The thimble 30, in the preferred construction, is formed with a shank 35 which is threadably fitted on a screw 36 that is anchored in a collar 37. The collar 37 is locked on the tip 17 by a set screw 38. As will be apparent, rotation of the thimble 30 on the screw 36 adjusts the relative positions of the head 31 and the point 18 axially of the sleeve 15. The shank 35 is slotted and compressed inwardly slightly so as to resiliently grip the screw 36. This provides a resiliently loaded mounting for the thimble 30 which insures that the thimble will remain in adjusted position.

To control the vertical position of the tip 17 under the bias of the weight 32, a stop 40 is journalled eccentrically on a pin 41 secured to the sleeve 15 beneath the lower edge 42 of the handle 25. The stop 40 includes a knurled manipulating portion 43 and a pair of flats 44 and 45 for releasably supporting the handle 25 in its raised position. That is, by rotating the stop 40 counterclockwise in FIG. 2, the handle 25 is cammed upwardly until the flat 45 underlies the handle edge 42, the position of the parts shown in dashed lines. With the handle raised to its dashed line position shown in FIG. 2, the spring 21 elevates the tip 17 so that the point 18 clears the work. The pair of flats 44, 45 permits the handle to be raised upon rotation of the stop 40 in either direction.

It has been found desirable for plastic chart making to form the point 18 conically and with a relatively sharp point angle, that is, one under 40°. In the illustrated embodiment the point 18 is formed with an angle 50 of approximately 30°. It has been found that better control of point penetration is achieved if the point is quite sharp and, indeed, a point angle of 15° has been successfully utilized for the making of plastic charts of the type described above.

The operation of the scribe can now be readily appreciated. The stop 40 is turned to the dashed line position shown in FIG. 2 so as to raise the handle 25 and permit the spring 21 to clear the tip point 18 from the working surface of the layout machine. The weight 32 is positioned on the handle 25 by simply slipping the dowel pin 33 into the hole 34. The thimble 30 is adjusted on the screw 36 so that the point 18 projects the desired distance beneath the smooth head 31.

The workpiece, such as a coated plastic sheet of the type referred to above, is then placed on the work surface of the layout machine and the stop 40 rotated so as to bring the point 18 into engagement with the plastic. The weight 32 causes the point 18 to penentrate the plastic until the smooth head 31 of the thimble 30 engages the chart material. The carriage 12 is then manipulated, together with the stop 40, to etch the desired lines into the chart material. The thimble 30 positively controls penetration of the point 18 into the work and thus uniform lines of the desired width are etched in the plastic.

I claim as my invention:

A scribe for a layout machine comprising, in combination, a sleeve adapted to be mounted in a layout machine for movement in a substantially vertical position over a horizontal work surface, a pointed tip slidably mounted in said sleeve so that the point projects from the lower end of the sleeve, a weight slidably mounted in the upper end of the sleeve for biasing said tip downwardly, means for holding said tip and said weight together for sliding movement in said sleeve, a stop mounted eccentrically on the outside of said sleeve so as to underlie a surface on said weight, said stop having a flat surface for abutting and holding said weight in raised position and being rotatable so as to lower the weight in the sleeve, a collar anchored to said tip, and a thimble threadably mounted on said collar for adjustment axially of said sleeve, said threadable mounting being resiliently loaded so as to hold said thimble in adjusted position, said thimble having a wide, smooth head disposed closely adjacent said point so that the adjusted positions of said head control the penetration of the pointed tip into soft material.

References Cited in the file of this patent

UNITED STATES PATENTS

| | | |
|---|---|---|
| 997,310 | Mehlem | July 11, 1911 |
| 1,876,612 | Chiotti | Sept. 13, 1932 |
| 2,734,272 | Brown | Feb. 14, 1956 |
| 2,777,200 | Wood | Jan. 15, 1957 |

FOREIGN PATENTS

| | | |
|---|---|---|
| 43,161 | Switzerland | Apr. 7, 1908 |
| 822,516 | Germany | Nov. 26, 1951 |